United States Patent [19]

Soulliard

[11] 4,355,210
[45] Oct. 19, 1982

[54] SUB-MINIATURE TONE ENCODER WITH AUTOMATIC NUMBER IDENTIFICATION

[75] Inventor: Charles Soulliard, Tucson, Ariz.

[73] Assignee: Midian Electronics, Inc., Tucson, Ariz.

[21] Appl. No.: 189,206

[22] Filed: Sep. 22, 1980

[51] Int. Cl.³ .......................................... H04M 1/50
[52] U.S. Cl. .............................. 179/84 VF; 455/36; 328/14
[58] Field of Search ................. 179/84 VF, 90 K; 328/14; 340/347 DA; 455/35, 36, 37, 38

[56] References Cited

U.S. PATENT DOCUMENTS 3,766,523 10/1973 Brocker et al. .................... 455/36 X
3,798,545 3/1974 Schultz et al. .................... 455/36 X

*Primary Examiner*—Joseph A. Popek
*Attorney, Agent, or Firm*—Harold Gell

[57] ABSTRACT

A digitally synthesized tone encoder and automatic number identification generator for a radio-telephone is presented herein. The system includes a tone burst generator for producing two audio tones simultaneously in response to either a keypad input or sequencing of a multiplexer providing a single-pole eight-throw switching function in response to the incrementing of a counter.

10 Claims, 2 Drawing Figures

SUB-MINIATURE TONE ENCODER WITH AUTOMATIC NUMBER IDENTIFICATION

TECHNICAL FIELD

This invention relates to a digitally synthesized tone encoder and automatic number identification generator capable of generating sinusoidal wave forms for voice band signalling in multitone telephone station sets.

BACKGROUND OF PRIOR ART

The use of multitone telephone dialing has become increasingly popular and has resulted in numerous means to create the required dual tones, one of the more popular being the employment of digital-to-analog tone synthesis. The application of this technique to the radio telephone art however has been handicapped in that the prior art fails to provide a compact, reliable, and economical digital tone generator including an automatic number identification means whereby all generating stations may be accurately identified.

OBJECTIVES OF THE INVENTION

Therefore, it is a primary objective of the present invention to provide a sub-miniature tone encoder incorporating an automatic number identification generating means.

A further objective of the present invention is to provide an automatic number identification system for a radio telephone dial tone encoder.

A still further objective of the present invention is to provide a sub-miniature digital calling signal tone generating system including an automatic number identification means activated by a push-to-talk switch in a radio telephone system.

A still further objective of the present invention is to provide an automatic number identification means for a digital calling signal tone generator which is activated by a specific key of a key pad set.

The preceding, and other objectives of the present invention will become apparent in light of the specification, drawings and claims which follow.

BRIEF SUMMARY OF THE INVENTION

The sub-miniature tone encoder and automatic number identification generating system disclosed herein is capable of generating the sixteen standard Bell System Touch Tones. The system incorporates a synthesized tone encoder based on a ceramic controlled master oscillator which provides high accuracy and stability.

The system includes a keyboard and scanned diode matrix which provides column and row inputs to an integrated tone dialer. The keyboard and scanned diode matrix program the internal divider and counters of the dialer to provide proper high and low tone groups. The synthesized high and low tone groups are processed in the dialer by a digital-to-analog converter and the combined tones are applied through a level setting potentiometer through filtering means to remove high frequency components to the system output.

A diode matrix provides an isolation input to the integrated tone dialer circuit from a key pad or the automatic number identifier logic which is a selected hard-wire programmed assembly of integrated circuits comprised of counters and a multiplexer. The automatic number identifier may be activated by a specific key on the touch pad or in the case of a radio telephone, by activation of the push-to-talk switch. When activated, the automatic number identifier causes a sequence of eight tone coded digits to be generated.

DETAILED DESCRIPTION OF THE INVENTION

Figure 1:
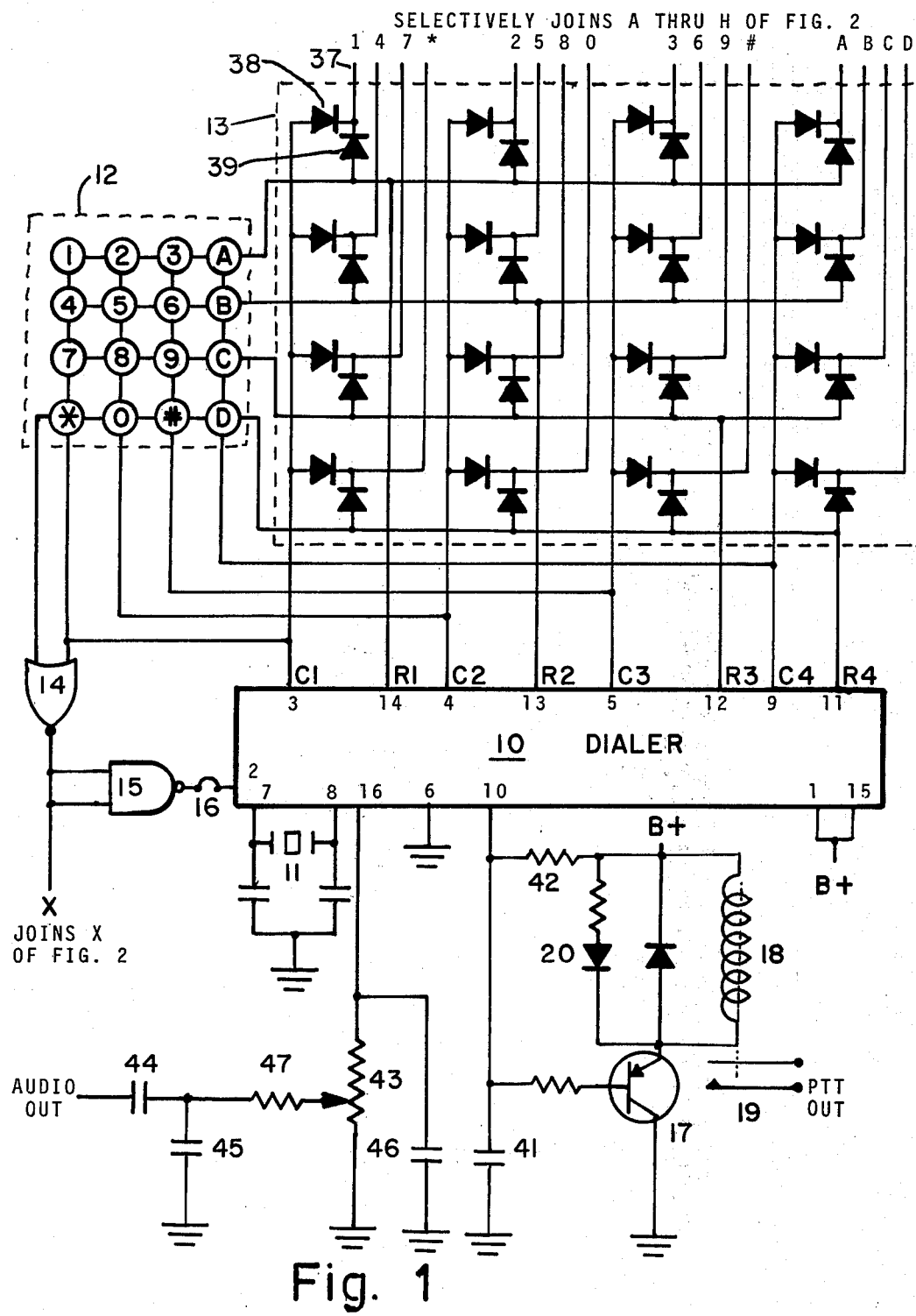
FIG. 1 is a schematic diagram of the integrated tone dialer, input diode matrix and key switch circuitry of the present invention.

FIG. 1 illustrates the basic dual-tone multi-frequency telephone dialing portion of the present invention. The dual-tone multi-frequency analog signals required by the Bell Touch Tone system are generated by the dialer 10 of FIG. 1 which digitally synthesizes eight different audio sinusoidal frequencies which are mixed to provide tones suitable for dual-tone multi-frequency telephone dialing. In a preferred embodiment, the system is coupled to a standard radio-telephone set of the type which incorporates a push-to-talk control.

The dialer 10 includes four column and four row logic inputs identified as C1 through C4 and R1 through R4 respectively. These inputs activate keyboard logic circuitry which control row and column counters which are stepped as a function of the output of the ceramic controlled master oscillator 11. The outputs of the row and column counters are applied to individual row and column sign wave counters which drive digital-to-analog converters to create row and column single tone sign waves which are combined to produce the desired multitone output.

The dialer, 10, may be a monolithic integrated circuit such as the MK5089 manufactured by Mostek Corporation of 1215 West Crosby Road, Carroliton, Texas 75006. This integrated circuit uses complimentary-symmetry MOS(CMOS) techniques and its row and column decoders are responsive to negative-true keyboard-inputs. To ensure proper dialing tones, the master oscillator 11 produces a reference signal of 3.579545 MHz which is divided by a factor of 4 within the dialer 10 to provide via the row and column counters, a series of pulse trains which are further divided via the row and column counters in response to keyboard logic inputs to produce the required pair of audio frequencies via the sign wave counters and digital-to-analog converters within the dialer. If the MK5089 or similar dialer is used, the two audio frequencies are combined in an operational amplifier which provides dialing tone outputs having a frequency stability that requires no further adjustment to meet standard dual-tone multi-frequency specifications.

The negative logic signals required to control the dialer may be provided by a standard 12 key pad input or a 16 key pad input as illustrated in FIG. 1. The 16 key pad input 12 of FIG. 1 provides the required logic input by presenting a ground potential to the dialer. For instance, if any of the keys in the row of pads containing 1, 4, 7, or * are depressed, the C1 input of dialer 10 is grounded. Thus if pad number 7 of the key pad switch assembly 12 is depressed, ground potential or a negative logic is presented at C1 to select the column and R3 to select the row tone.

Single tones can be generated by simultaneously depressing two buttons in the same column or row of the key pad switch 12. The tone frequency thus generated will be the one associated with the column or row in which both buttons were pressed.

Diode matrix 13 functions to isolate the key pad switch 12 from the automatic number identification circuitry of FIG. 2 which will be discussed subsequently. The automatic number identification circuitry is activated by an output from NOR gate 14 which is responsive to the * but not of key pad 12. The output of NOR gate 14 is also applied to the CHIP DISABLE input of dialer 10 via inverter 15. Thus when the * button is activated, the dialer is muted for the * tone and upon release of the * button, the automatic number identifier system of FIG. 2 begins functioning. If desired, jumper 16 may be removed and the automatic number identification sequence will commence after the * tone.

When a column and row input is received by the dialer 10, a negative output is provided at the ANY KEY DOWN output pin 10. This causes transistor 17 to conduct which energizes relay 18 which closes a transmitter switch 19 to provide a push-to-talk function. Conduction of transistor 17 also causes light emitting diode 20 to be illuminated and provide an indication that dialing is commencing and a push-to-talk function has been generated.

Capacitor 41 and resistor 42 form a time constant network which maintains transistor 17 conducting for approximately 2 seconds after release of a key to ensure that the transmitter remains keyed during production of the dialing tone which is provided at the output, pin 16, of dialer 10. This output is applied via potentiometer 43 and the high frequency filter network comprised of capacitors 44, 45, and 46 and resistor 47 to the audio circuit of the transmitter.

Figure 2:
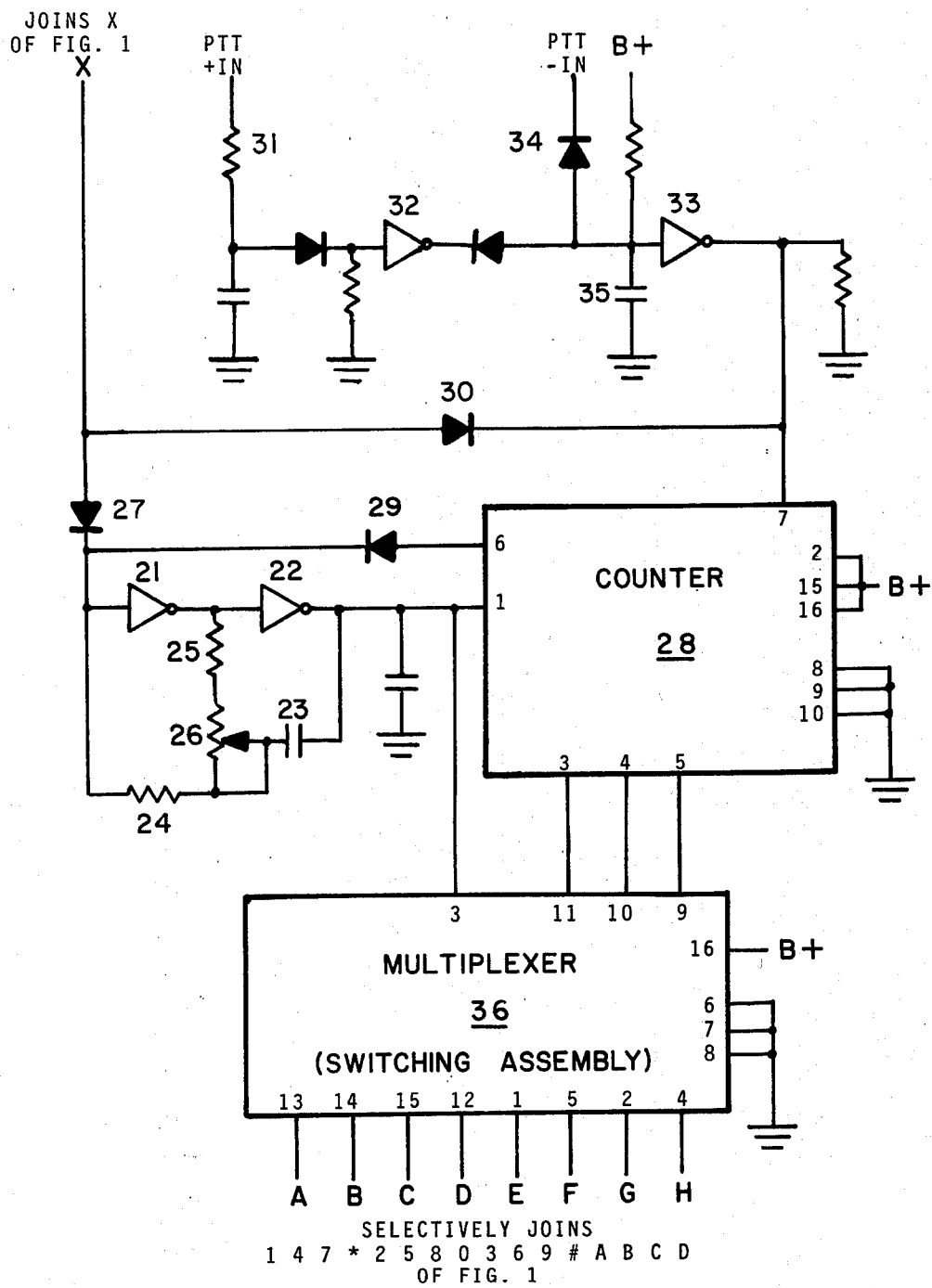
FIG. 2 is a schematic diagram of the automatic number identifier circuitry of the present invention.

The automatic number identifier circuitry of FIG. 2 is activated by a clock comprised of amplifiers 21 and 22 and the associated RC circuit including capacitor 23 and resistances 24, 25, and 26. Resistor 26 may be adjusted to control the frequency of the clock and thus the speed of the automatic number identification system. The clock is started by an input from NOR 14 gate of FIG. 1 via diode 27 and is released by a signal from pin 6 of counter 28 via diode 29.

The automatic number identifier system begins functioning in response to an input applied to pin 7 of counter 28. This reset input may be provided by NOR gate 14 in response to depression of the * key of FIG. 1 as previously discussed. In this mode of operation, the controlling potential is applied to pin 7 of counter 28 via diode 30.

Alternately, the automatic number identifier may be activated by the push-to-talk switch functioning in either a positive or negative mode. If the push-to-talk switch is functioning in a positive mode, the input is applied to resistor 31 and thence via amplifier inverters 32 and 33 to pin 7. If the push-to-talk system is functioning in a negative mode, a negative input is applied to diode 34 and thence via inverter amplifier 33 to pin 7 to counter 28.

Capacitor 35 of the push-to-talk control circuitry functions as a timing capacitor in combination with the other circuit components which provides a delay feature in that it mutes or prevents the automatic number identifier from occurring during an 18 second interval following the end of release of the push-to-talk switch. If desired, the delay feature can be eliminated by disconnecting capacitor 35.

Counter 28 is a binary coded decimal up counter which provides outputs at pins 3, 4, and 5. In a preferred embodiment, counter 28 may be provided by one-half of a Motorola integrated circuit MC14518.

The BCD output of counter 28 is applied to an 8 channel analog multiplexer 36 such as a Motorola 14051 which is used as a selective switching assembly. The output of this multiplexer is comprised of sequentially grounding outputs A through H in a scanning fashion for each input to pin 7 of counter 28. Pins A through H are selectively connected to diode matrix 13 of FIG. 1 to provide activation of a column and row combined tone via dialer 10 in a manner similar to that which occurs when a push-button of pad 12 is depressed. For instance, if output A of multiplexer 36 is connected to junction 37 of the diode matrix 13 of FIG. 1, column 1 is activated via diode 38 and row 1 is activated via diode 39 to provide an output from the dialer identical to the output provided when push-button 1 is depressed.

By proper interconnection of the outputs A through H of multiplexer 36 to the junctions within diode matrix 13, an identifying code will be transmitted by the system whenever a reset pulse is applied to pin 7 of counter 28. Normally, the clock oscillator comprised of amplifiers 21 and 22 is inhibited by the pin 6 high output of counter 28, but resetting via pin 7 removes the inhibition to the clock until the counter has caused the 8 channel analog multiplexer 36 to scan through outputs A through H. After the multiplexer has scanned through outputs A through H, the counter is inhibited and multiplexer 36 is returned to its quiescent tri state.

In the preferred embodiment, in the quiescent state pin 6 of counter 28 is high and this inhibits the clock oscillator comprised of amplifiers 21 and 22 and related circuitry. When a reset signal is applied to pin 7 of counter 28, pin 6 goes to a 0 logic level and the clock counter begins applying pulses to the clock input pin 1 of counter 28 and pin 3, the common input to multiplexer 36.

The reset input to pin 7 of counter 28 is in the form of a low logic level which, coupled with the high logic level applied to the enable input, pin 2 of counter 28, conditions the counter to increment one step for each low to high transition at pin 1 as provided by the clock oscillator. In the quiescent state, the outputs at pins 3, 4, and 5 of counter 28 are low and this results in pin 13 of the multiplexer being internally connected to pin 3. With the first positive transition of the clock signal, pin 3 of the counter goes high which causes the multiplexer to switch the internal connection of pin 3 from pin 13 to pin 14. The next positive transition of the counter causes counter output pin 3 to go low and counter output pin 4 to go high. This causes multiplexer internal connections to shift the pin 3 input to the pin 15 output. The next clock pulse causes counter pin 3 to go high while counter pin 4 remains high. This causes the multiplexer to shift the input pin 3 internal connection to pin 12. The next clock transition causes counter outputs 3 and 4 to go low and 5 to go high which causes the multi-plexer to shift the internal connection of pin 3 to pin 1. In the next positive transition of the clock, counter outputs 3 and 5 are high and 4 is low. This results in multiplexer 36 switching its internal connections so that pin 3 is connected to pin 5. The sixth transition from low to high of the clock input to counter 28 results in a low logic level at pin 3 and a high logic level at pins 4 and 5 and as a result the internal connections at multiplexer 36 is switched so that input 3 is connected to output pin 2. On the seventh clock transition, outputs 3, 4, and 5 go to a high logic level and the multiplexer 38 input pin 3 is connected to output pin 4.

During the preceding stepping of counter 28, output pin 6 of the counter has been at a low logic level. However, on the next transition from low to high of the clock input to pin 1 of counter 28, pins 3, 4, and 5 of the counter are driven to a low logic level and pin 6 is driven to a high logic level. The low logic levels on pins 3, 4, and 5 cause the multiplexer 36 to shift to its quiescent state wherein pin 3 is connected to pin 13 and the high logic level at pin 6 of counter 28 inhibits the operation of the clock oscillator until the system is reset via pin 7 as previously explained.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A tone encoder, comprising:
   a selective switching means;
   a counter for providing incrementing pulses to said selective switching means;
   a clocking pulse train generator responsive to an output of said counter for incrementing said counter;
   a tone burst generator for simultaneously providing two audio tone bursts; and
   an isolation matrix for coupling said selective switching means to said tone burst generator whereby said selective switching means controls the frequency of the outputs of said tone burst generator.

2. A tone encoder as defined in claim 1, wherein said selective switching means comprises:
   a single-pole eight-throw electronic switch.

3. A tone encoder as defined in claim 2, wherein said counter comprises:
   a BCD counter for generating a three pulse code output coupled to said selective switching means for controlling the state of said single-pole eight-throw electronic switch; and a pulse for inhibiting said counter after a predetermined count.

4. A tone encoder as defined in claim 3, wherein said isolation matrix comprises:
   diode means for selectively coupling switching function outputs of said switching means to control inputs of said tone burst generator.

5. A tone encoder as defined in claim 4, further comprising: a multi-digit keypad switch assembly coupled to said tone burst generator via said isolation matrix for manually controlling the output of said tone burst generator.

6. A tone encoder as defined in claim 5, further comprising:
   means for resetting said counter and activating said clock generator in response to manipulation of said keypad.

7. A tone encoder as defined in claim 6, further comprising:
   a radio-telephone set incorporating a push-to-talk switch; and
   means to couple said radio-telephone push-to-talk switch to said counter whereby said counter is reset by the action of said push-to-talk switch and said clock generator is activated.

8. A tone encoder as defined in claim 7, further comprising:
   a transmitter switch; and
   means responsive to said tone burst generator for activating said transmitter switch.

9. A tone encoder as defined in claim 8, wherein said transmitter switch provides a push-to-talk function.

10. A tone encoder as defined in claim 1, wherein said tone burst generator comprises a master oscillator and integrated circuit means for digitally generating said two audio tone bursts from an output of said master oscillator.

* * * * *